(12) United States Patent
Paakkunainen

(10) Patent No.: US 9,845,588 B2
(45) Date of Patent: Dec. 19, 2017

(54) HYDRAULIC CONTROL SYSTEM FOR CONTROLLING A MOVEABLE DEVICE

(71) Applicant: John Deere Forestry Oy, Tampere (FI)

(72) Inventor: Marko Paakkunainen, Tampere (FI)

(73) Assignee: JOHN DEERE FORESTRY OY, Tampere (FI)

( * ) Notice: Subject to any disclaimer, the term of this patent is extended or adjusted under 35 U.S.C. 154(b) by 142 days.

(21) Appl. No.: 14/918,207

(22) Filed: Oct. 20, 2015

(65) Prior Publication Data

US 2016/0131162 A1 May 12, 2016

(30) Foreign Application Priority Data

Nov. 12, 2014 (EP) ..................................... 14397534

(51) Int. Cl.
*E02F 9/22* (2006.01)
*A01G 23/00* (2006.01)
(Continued)

(52) U.S. Cl.
CPC .......... *E02F 9/2267* (2013.01); *A01G 23/003* (2013.01); *A01G 23/08* (2013.01);
(Continued)

(58) Field of Classification Search
CPC ....... B60K 6/485; B60W 10/08; B60W 10/30; B60W 20/00; E02F 3/435; E02F 3/425; E02F 3/32; E02F 9/226; E02F 9/2292; E02F 9/265; E02F 9/2221; E02F 9/2285; E02F 9/264; E02F 9/2203; E02F 9/2214; E02F 9/2282; E02F 9/2296; E02F 9/2079; E02F 9/2091; E02F 9/2267; E02F 9/2228; E02F 9/2235; A01G 23/003; A01G 23/08; F15B 2211/20546; F15B 2211/50536; F15B 2211/6309; F15B 2211/6336; F15B 2211/6346; F15B 2211/6353; F15B 2211/7053; F15B 2211/7058
USPC ........... 37/347, 348; 172/2–11; 60/466, 468; 91/433; 212/278, 280; 414/686, 699, 414/700, 713; 701/50
See application file for complete search history.

(56) References Cited

U.S. PATENT DOCUMENTS 6,705,826 B1 * 3/2004 Callens .................. B66F 9/065
                                                              414/686
7,930,970 B2 * 4/2011 Nishikawa ............ E02F 9/2203
                                                                91/433
(Continued)

*Primary Examiner* — Robert Pezzuto
(74) *Attorney, Agent, or Firm* — Lorenz & Kopf, LLP

(57) ABSTRACT

A control system for controlling a moveable device includes at least one hydraulic actuator associated with the moveable device, at least one position sensing device to determine the position of the moveable device or the actuator, or both, and a hydraulic control system, including an electronic control unit, for controlling the actuator. For performing a control method, the hydraulic control system is configured to deliver pressurized hydraulic fluid to the actuator, the hydraulic fluid being pressurized at most to a predetermined maximum pressure, and the control system is adapted to regulate the predetermined maximum pressure based on the determined position. According to an example, the moveable device is a boom of a working machine. According to a further example, the actuator is a hydraulic cylinder or motor.

17 Claims, 6 Drawing Sheets

(51) Int. Cl.
*A01G 23/08* (2006.01)
*F15B 21/08* (2006.01)
(52) U.S. Cl.
CPC .......... *E02F 9/2203* (2013.01); *E02F 9/2228* (2013.01); *E02F 9/2235* (2013.01); *E02F 9/2296* (2013.01); *F15B 21/087* (2013.01); *F15B 2211/20546* (2013.01); *F15B 2211/50536* (2013.01); *F15B 2211/6309* (2013.01); *F15B 2211/6336* (2013.01); *F15B 2211/6346* (2013.01); *F15B 2211/6653* (2013.01); *F15B 2211/7053* (2013.01); *F15B 2211/7058* (2013.01)

(56) References Cited

U.S. PATENT DOCUMENTS

| | | | | |
|---|---|---|---|---|
| 8,272,521 B1 * | 9/2012 | Kemmerly | ............ | B66C 13/16 |
| | | | | 212/278 |
| 8,972,122 B2 * | 3/2015 | Magaki | ................ | E02F 9/2214 |
| | | | | 701/50 |
| 9,145,660 B2 * | 9/2015 | Peterson | ............... | E02F 9/2235 |
| 9,340,953 B2 * | 5/2016 | Sakamoto | ............... | B60K 6/485 |
| 9,382,687 B2 * | 7/2016 | Tsukamoto | ............. | E02F 3/435 |
| 9,518,370 B2 * | 12/2016 | Tsukamoto | ............. | E02F 3/435 |

* cited by examiner

HYDRAULIC CONTROL SYSTEM FOR CONTROLLING A MOVEABLE DEVICE

CROSS-REFERENCE TO RELATED APPLICATION(S)

This application claims priority under 35 U.S.C. §119 to European Application No. 14397534.0, filed Nov. 12, 2014, and entire contents of which are incorporated herein by reference.

STATEMENT OF FEDERALLY SPONSORED RESEARCH OR DEVELOPMENT

Not applicable.

FIELD OF THE DISCLOSURE

The disclosure relates to a control system for controlling a moveable device. The disclosure further relates to a working machine vehicle having a moveable device which is an articulated boom or a boom section of the articulated boom connected to the working machine vehicle. The disclosure further relates to a method of controlling a moveable device by using a hydraulic control system having an electronic control unit.

BACKGROUND OF THE DISCLOSURE

Working machines, in particular forestry equipment and forest machines, e.g. a harvester and a forwarder, have an articulated boom and a tool attached to the boom. The tool can be e.g. a harvester head, a felling head, a harvesting and processing head, or a log grapple. The tool can be used e.g. to cut standing trees, to process felled trees or to grab objects, such as logs or tree trunks. When using such a tool, it is moved under the control of an operator of the work machine to a desired position mainly by controlling the position of the boom and moving the tool with the boom.

The hydraulic control systems for controlling e.g. the boom are dimensioned for a predetermined highest maximum pressure requirement. In the previously known hydraulic control systems for e.g. the working machines with a boom, the force and especially the available net force for lifting loads or moving the boom can be perceived as too small when the boom is extended or the horizontal reach of the boom is reaching its maximum. On the other hand, the available net force for lifting loads or moving the boom can be perceived as unnecessarily high when the boom is retracted or the horizontal reach of the boom is reaching its minimum. In the former case it may be impossible to perform selected work functions and in the latter case hydraulic energy is wasted or the boom must be constructed unnecessarily durable to take long-term overload. Thus, there are conflicting design requirements because the available net force should be high and the boom should be constructed with long reach and a light structure.

SUMMARY OF THE DISCLOSURE

The solution to be presented is directed to overcoming one or more disadvantages noted above and associated also with other type of moveable devices the position of which is controlled with hydraulic actuators generating forces necessary to perform work functions.

According to the presented solution, the control system for controlling the moveable device comprises at least one hydraulic actuator associated with the moveable device for performing at least one work function, at least one position sensing device to determine the position of the moveable device or the hydraulic actuator, or both, and a hydraulic control system, including an electronic control unit, for controlling the hydraulic actuator.

The hydraulic control system is configured to deliver pressurized hydraulic fluid to the hydraulic actuator, the hydraulic fluid being pressurized at most to a predetermined maximum pressure, and the control system is adapted to regulate the predetermined maximum pressure based on the determined position.

The hydraulic actuator is adapted to rotate or slew the moveable device about an axis or to linearly move the moveable device. According to an example of the presented solution, the hydraulic actuator is a linear actuator, e.g. a hydraulic cylinder, connected to the moveable device. According to another example of the presented solution, the hydraulic actuator is a rotary actuator, e.g. a hydraulic motor, connected to the moveable device.

According to the presented solution, the working machine vehicle has the moveable device which is an articulated boom or a boom section of the articulated boom connected to the working machine vehicle. The working machine vehicle further comprises a control system as presented above. The linear actuator may be used as a lifting cylinder of the articulated boom. The rotary actuator may be used in a slewing apparatus of the articulated boom.

According to the presented solution, the method of controlling the moveable device by using a hydraulic control system having an electronic control unit. The method provides the following steps: performing a work function with a moveable device controlled by at least one hydraulic actuator associated with the moveable device, sensing the position of the moveable device or the actuator, or both, delivering hydraulic fluid to the hydraulic actuator and pressurizing the hydraulic fluid at most to a predetermined maximum pressure, and regulating the predetermined maximum pressure based on the determined position.

Below, the presented solution will be described in connection with a working machine vehicle in the form of a forestry harvester having an articulated boom. Preferably, the boom has two or more boom sections connected one after the other by means of one or more joint arrangements. The forestry harvester and its boom are not limiting applications of the presented solution. The solution can for example also be used for other types of working machines which are vehicles, such as a forestry forwarder, an agricultural tractor, a working machine equipped with a backhoe or a front end loader, a construction equipment vehicle or an excavator. The tool attached to the boom may for example be a bucket, a grapple or a fork.

A technical effect related to the presented solution is increased available net forces when handling a load with an extended articulated boom. Another technical effect related to the presented solution is reduced available net forces when handling a load with a retracted articulated boom or when slewing the retracted articulated boom. In the latter case, joint arrangements of the articulated boom experience less overload compared to traditional solutions.

According to examples of the presented solution, a directional control valve device or a hydraulic pump device of the control system is controlled based on a control strategy of the presented solution. A technical effect related to the former is actuator-specific pressure control. A technical effect related to the latter is energy saving compared to pressure control based on pressure control valves.

The details of one or more embodiments are set forth in the accompanying drawings and the description below. Other features and advantages will become apparent from the description, the drawings, and the claims.

DETAILED DESCRIPTION

Reference will now be made to an example of the presented solution which is illustrated in the accompanying drawings.

Figure 1:
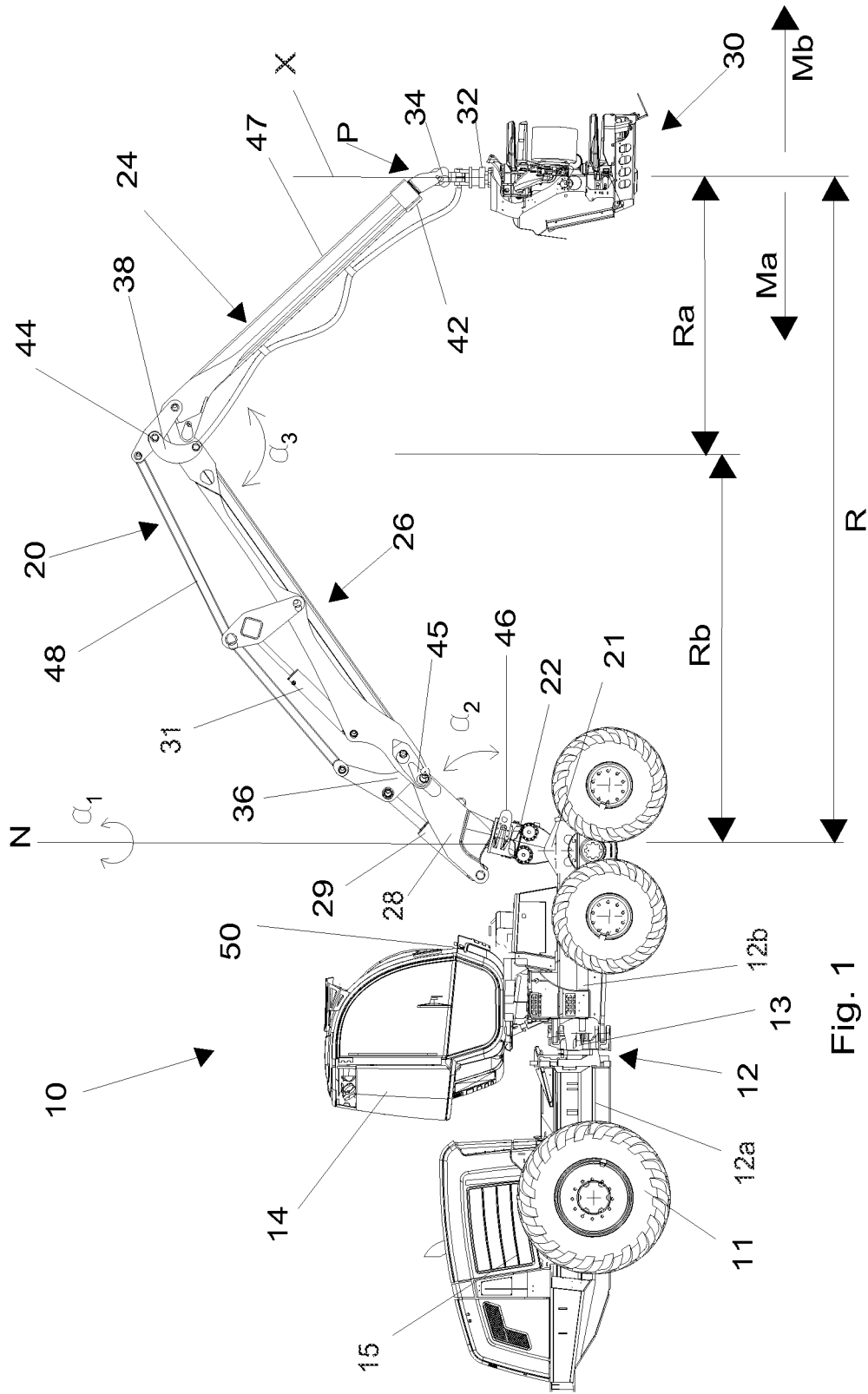
FIG. 1 shows an example of a working machine having a boom and a tool.

FIG. 1 shows an example working machine 10 in which the presented solution can be applied. The working machine 10 may be a forestry working machine, for example a forestry harvester.

The working machine 10 may comprise a frame 12, a cabin 14 with an operator's station, an engine 15 as the source of power, a slewing apparatus 22 and an articulated boom 20. The working machine 10 may further comprise a tilting apparatus 21. A tool 30 may be connected to the boom 20.

The frame 12 may be articulated and have two or more frame sections 12a, 12b connected one after the other by means of a controlled joint 13. The frame 12 is wheeled and supported by several wheels 11. Alternatively or additionally, the frame 12 may have an endless track arrangement for supporting the frame 12 and to drive the work machine 10.

According to another example, the work machine 10 may have a load space located on the frame 12 or the frame section 12a, 12b. The load space may have several bunks for supporting a load. The load space is for carrying logs or tree trunks loaded into the load space.

The boom 20 is mounted onto the slewing apparatus 22 connected to the frame 12. By turning the slewing apparatus 22, the boom 20 can be rotated or slewed about a rotation axis N that is oriented vertically or substantially vertically. In an example of the solution, the slewing apparatus 22 may be connected to the frame 12 via the tilting apparatus 21 for tilting the boom 20 such that the axis N is controllably tilted.

The slewing apparatus 22 or the tilting apparatus 21 may include a linear actuator, e.g. a hydraulic cylinder, for rotating or tilting. The slewing apparatus 22 may include a rotary actuator, e.g. a hydraulic motor, for rotating or slewing.

The boom 20 may have two or more boom sections 24, 26, 28 connected one after the other. Two or more boom sections 24, 26, 28 are connected to each other by means of a joint arrangement 36, 38. The joint arrangement 36, 38 may provide rotation around a horizontal rotation axis. The joint arrangement 36, 38 may be controlled by means of one or several linear actuators 29 and 31, e.g. a hydraulic cylinder.

In the example of FIG. 1, the base boom section 28 is connected between the slewing apparatus 22 and the second boom section 26. The position of the second boom section 26 in relation to the base boom section 28 is controlled by the linear actuator 29. The linear actuator 29 is connected between the base boom section 28 and the second boom section 26. Alternatively, the second boom section 26 is pivotally connected to the slewing apparatus 22 without the base boom section 28 and the linear actuator 29 is connected between the second boom section 26 and the slewing apparatus 22. The first boom section 24 is connected to the second boom section 26. The position of the first boom section 24 in relation to the second boom section 26 is controlled by the linear actuator 31. The linear actuator 31 is connected between the second boom section 26 and, either directly or via the joint arrangement 38, the first boom section 24.

One or more boom sections of the boom 20 may operate telescopically and move linearly. The extension and the length of the telescopically operating boom section is controlled by means of two or more boom section parts arranged movably within each other. One or several linear actuators may be used to control the relative positions of the boom section parts. The linear actuator is connected to the boom section of the boom 20 provided with the boom section parts and the linear actuator is located either inside or outside the boom section. According to an example, the first boom section 24 is arranged telescopically operating.

The tool 30 may be connected at the end of the boom 20 or the first boom section 24, or a boom section part of the boom 20, represented by a tip P of the boom 20 in FIG. 1.

The tool 30 may be rotatably connected to the tip P by means of an actuator 32, e.g. a rotator or a rotary actuator. With the actuator 32, the tool 30 suspended to the actuator 32 can be controllably rotated about a rotation axis X that is oriented vertically or substantially vertically. The position of the tool 30 is thus controlled with the actuator 32. According to an example and FIG. 1, the actuator 32 may be connected to the boom 20 via a connecting link 34 maintaining the upright position of the tool 30.

The tool 30 may be a harvester head, a felling head, a harvesting and processing head, a harvester head suitable to be used as a log grapple, or a log grapple. In relation to the presented solution, the slewing apparatus 22, the tilting apparatus 21, the tool 30, the articulated boom 20, a combination of two or more boom sections of the boom 20, the boom section 24, 26 or 28, or a boom section part of the boom section 24, 26 or 28, as presented above, is an example representing a moveable device 78 (see FIG. 2 and FIG. 6) performing a work function when controlled with an actuator 63 associated with the moveable device 78.

Figure 2:
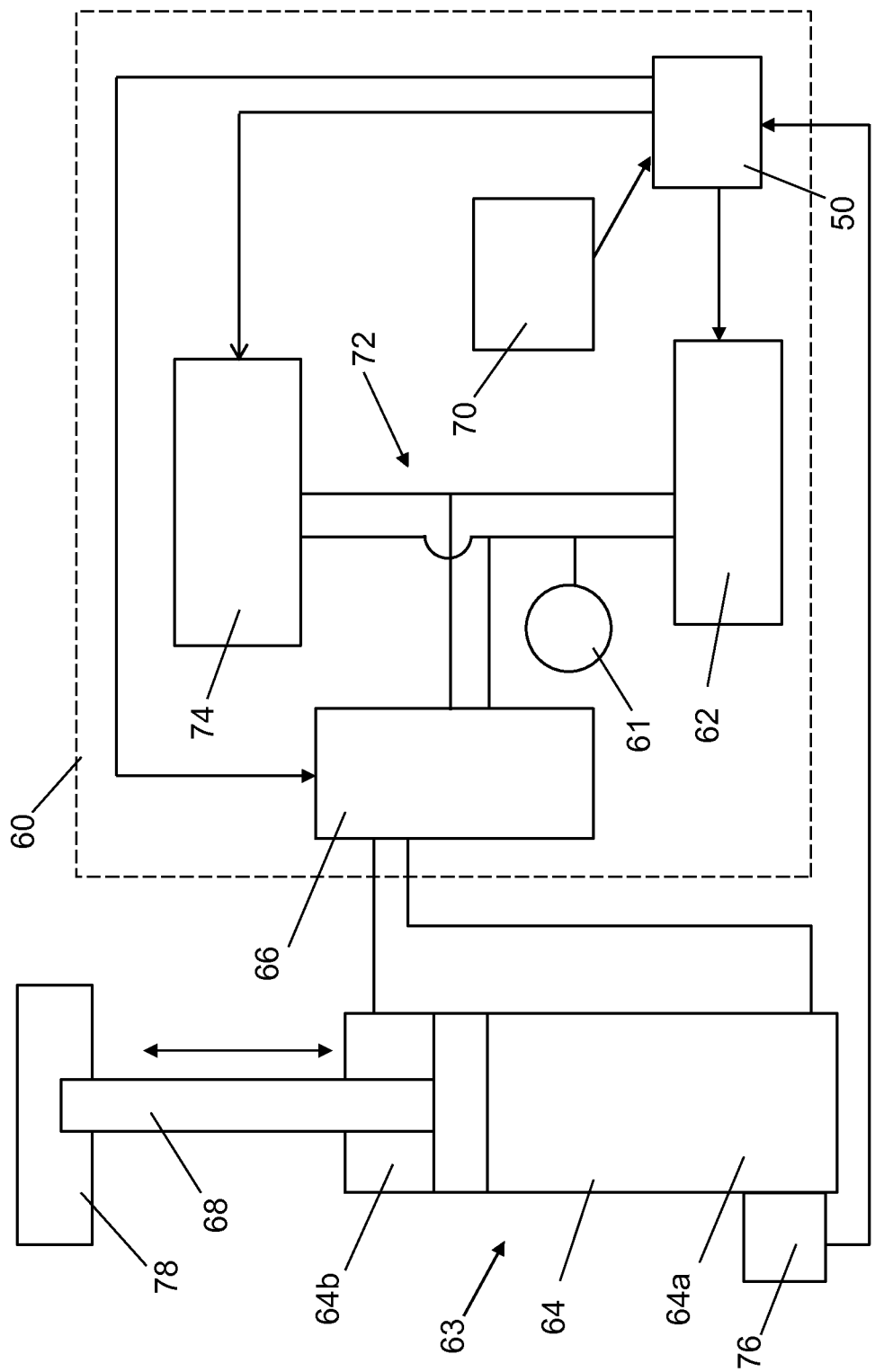
FIG. 2 shows a first example of a hydraulic control system relating to the presented solution.
Figure 6:
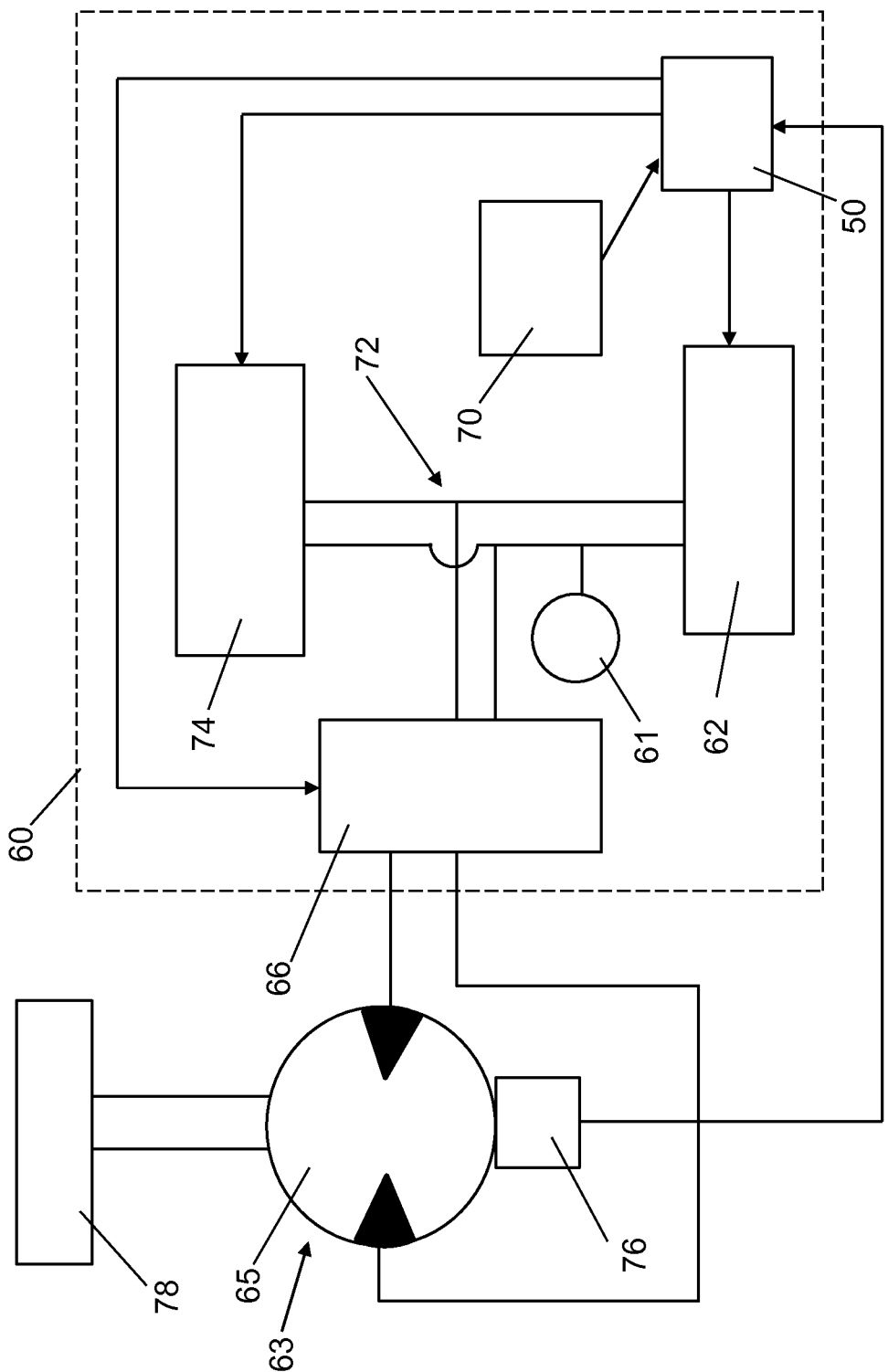
FIG. 6 shows a second example of a hydraulic control system relating to the presented solution.

The actuator 63 may be a linear actuator 64, as exemplified in FIG. 2, or a rotary actuator 65, as exemplified in FIG. 6. The actuator 63 changes the position of the moveable device 78 when performing the work function. The moveable device 78 may be configured to rotate or turn about a rotation axis, e.g. a horizontal or vertical axis, or to move linearly.

One or more boom sections of the boom 20 operate by raising and lowering the tool 30 or another boom section of the boom 20 connected to the boom section. According to an example and FIG. 1, the second boom section 26 is pivotally connected to the base boom section 28. In this way, the reach Rb of the second boom section 26 can be controlled by turning the second boom section 26 about a horizontal or substantially horizontal rotation axis. The second boom 26 is pivotally connected to the first boom section 24. In this way, the reach Ra of the first boom section 24 can be controlled by turning the first boom section 24 about a horizontal or substantially horizontal rotation axis.

The reach R of the boom 20 or the tip P can be controlled by turning the first boom section 24 or the second boom section 26, or both. The reach R may be represented by a reach in a horizontal direction (see FIG. 1), in a substantially horizontal direction or in a sloping direction, as will be described below.

A reference point, or reference points, for determining the reach R, Ra or Rb in question may, for example, be a predetermined point at the boom 20 or the working machine 10, the point where the boom 20 is connected to the working machine 10, the joint arrangement 36, 38, the tip P of the boom 20, the point where the tool 30 is connected to the boom 20, or one or both ends of a boom section of the boom 20.

Thus, in relation to the presented solution, the reach R, Ra or Rb may relate to the moveable device 78 and the reference point may, for example, be one or both ends of the moveable device 78 or the point at which the moveable device 78 is connected to another device or structure, e.g. via a joint arrangement.

An example hydraulic control system 60 related to the presented solution and for controlling the actuator 63 associated with the moveable device 78 is shown in FIGS. 2 and 6.

The control system 60 may comprise an apparatus 62 for generating hydraulic energy and supplying pressurized hydraulic fluid, delivered via a hydraulic transmission line arrangement 72. The control system 60 may further comprise one or more directional control valve devices 66, one or more pressure control devices 74, one or more control devices 70 for the use of an operator controlling the moveable device 78, and further an electronic control unit 50 and one or more position sensing devices 76.

The hydraulic transmission line arrangement 72 may have channels, rigid lines or flexible hoses for delivering hydraulic fluid to the components of the control system 60.

The apparatus 62 may be controlled by the electronic control unit 50 via electrical signals. According to an example the apparatus 62 is a hydraulic pump device. The hydraulic pump device may be a variable displacement pump. According to another example, the hydraulic pump device includes load-sensing functions.

The apparatus 62 may be based on electric energy stored in an accumulator or generated with a generator operatively connected to the engine 15 of the working device 10. Alternatively or additionally, the apparatus 62 is based on mechanical energy for converting it to hydraulic energy. The apparatus 62 may be operatively connected to the engine 15 of the working machine 10.

The control device 70 may be a joystick. Preferably, the control device 70 is located at the operator's station in the cabin 14. With the control device 70, the operator may move for example the boom 20, the tip P of the boom 20, a boom section of the boom 20, or the tool 30 either towards (with a movement Ma) or away from (with a movement Mb) the working machine 10 or the reference point of the example in FIG. 1. The control device 70 may be operably connected with the electronic control unit 50.

The directional control valve device 66 controls the actuator 63 by means of controlling the flow of the pressurized hydraulic fluid of the hydraulic transmission line arrangement 72. The directional control valve device 66 is controlled by the electronic control unit 50 via electrical signals. According to an example, the directional control valve device 66 may include a directional control valve having ports for the pressurized hydraulic fluid and preferably providing proportional flow control. According to another example, the directional control valve further includes pressure reducing functions.

The pressure control device 74 limit the pressure of the hydraulic fluid in the hydraulic transmission line arrangement 72 or in a part of the hydraulic transmission line arrangement 72. The pressure control device 74 may be electronically controlled by the electronic control unit 50 and it may include one or more pressure control valves, e.g. a relief valve or a pressure reducing valve. The pressure control device 74 may limit the pressure of the hydraulic fluid fed to the actuator 63.

According to an embodiment of the presented solution and FIG. 2, the actuator 63 is a linear actuator 64. The linear actuator 64 may be a hydraulic cylinder utilizing hydraulic energy and pressurized hydraulic fluid which is transmitted to the linear actuator 64 by means of the hydraulic transmission line arrangement 72.

The hydraulic cylinder may be a single acting cylinder or a double acting cylinder as shown in FIG. 2. The hydraulic cylinder has a reciprocating piston rod 68 and at least a piston side chamber 64a connected with the hydraulic transmission line arrangement 72. The hydraulic cylinder may further have a piston rod side chamber 64b connected with the hydraulic transmission line arrangement 72.

The linear actuator 64 is connected to the moveable device 78. For example, the linear actuator 64 of FIG. 2 may represent a linear actuator of the working machine 10 in FIG. 1, for example a linear actuator of the boom 20, the linear actuator 29, the linear actuator 31 or a linear actuator in the slewing apparatus 22 or the tilting apparatus 21. According to an example the linear actuator 64 is a lifting cylinder of the boom 20 in FIG. 1, for example the linear actuator 29.

The directional control valve device 66 is adapted to control the reciprocating piston rod 68 of the linear actuator 64. To extend the piston rod 68, pressurized hydraulic fluid is led to the piston side chamber 64a. To retract the piston rod 68, pressurized hydraulic fluid is led to the piston rod side chamber 64b. Hydraulic fluid returning from the linear actuator 64 may be led to a tank via the hydraulic transmission line arrangement 72. A force is generated in the linear actuator 64 as a function of the pressure of the hydraulic fluid.

According to another embodiment of the presented solution and FIG. 6, the actuator 63 is a rotary actuator 65. The rotary actuator 65 may be a hydraulic motor utilizing hydraulic energy and pressurized hydraulic fluid which is transmitted to the rotary actuator 64 by means of the hydraulic transmission line arrangement 72. The rotary actuator 65 may be connected to the moveable device 78 to change its position.

The directional control valve device 66 is adapted to control the rotation of the rotary actuator 63. The rotary actuator 65 may be adapted to rotate or slew the moveable device 78 about an axis, e.g. in the slewing apparatus 22 of FIG. 1. A torque is generated in the rotary actuator 65 as a function of the pressure of the hydraulic fluid.

The control system 60 may further have one or more pressure sensing devices 61 for detecting pressures related to the hydraulic fluid in the hydraulic transmission line arrangement 72, in a part of the hydraulic transmission line arrangement 72 or led to the actuator 63 and controlled by the directional control valve device 66. The pressure sensing device 61 may be operably connected to the electronic control unit 50. The pressure sensing device 61 may be a pressure sensor.

The control system 60 may be load-sensing such that, based on signals received from the one or more pressure sensing devices 61, the apparatus 62 is controlled by the electronic control unit 50 to supply hydraulic fluid with regulated pressure. Alternatively or additionally, the one or more pressure sensing devices 61 may control the hydraulic pump device of the apparatus 62 to supply hydraulic fluid with regulated pressure dependent on the loading of the control system 60.

The position sensing device 76 is adapted to determine the position of the moveable device 78, or the actuator 63, for example the linear actuator 64 and the rotary actuator 65 described above. The position sensing device 76 is operably connected, via a wire or wirelessly, to the electronic control unit 50. The operational principle of the position sensing device 76 may vary and optical, electro-optical, mechanical, electro-mechanical, electrical, and resistive sensor types may be used as the position sensing device 76.

The position sensing device 76 generates signals indicative of the position of the moveable device 78 or the actuator 63. The position may be represented as a relative or absolute position. The position of the actuator 63 associated with the moveable device 78 may be dependent on the position of the moveable device 78. Therefore, the position of the moveable device 78 can be determined from the signals indicative of the position of the actuator 63.

According to an example and FIG. 2, the position sensing device 76 is adapted to detect the stroke of the linear actuator 64 or the position of the piston rod 68. According to another example and FIG. 6, the sensing device 76 is adapted to detect the angular position of the rotary actuator 65. The sensing device 76 may be located in or at the actuator 63.

An example arrangement of the one or more position sensing devices 76 in relation to the control system 60 is presented referring to FIG. 1. The position sensing device 76 may represent one or more of the following sensing devices: a sensing device 42 arranged to determine the position of the boom 20, the tip P or the first boom section 24, a sensing device 44 for measuring an angle α3 of the first boom section 24, a sensing device 45 for measuring an angle α2 of the boom 20 or the second boom section 26, a sensing device 46 for measuring an angular position of the slewing apparatus 22 or an azimuth angle α1 of the boom 20, the second boom section 26 or the base boom section 28, a sensing device 47 for measuring the length of a telescopic boom section of the boom 20, and a sensing device 48 for measuring the position of a boom section of the boom 20.

The electronic control unit 50 may be located in the cabin 14 or on the frame 12 of the work machine 10. A display may be connected to the electronic control unit 50 for showing information and data to the operator. Control signals from the control device 70 are communicated to the electronic control unit 50 and the electronic control unit 50 controls the control system 60 and its components to change the position of the moveable device 78.

The electronic control unit 50 may a programmable microprocessor-based device with a memory device and associated computer program code, for generating control signals to responsively control various actuators. The computer program code may be in a form of a control program or a control algorithm, or appropriate computer software, running or being executed under the control of the electronic control unit 50. The electronic control unit 50 may have a distributed configuration with several subunits communicating with each other. The electronic control unit 50 performs control methods based on the input information received by the control unit from the sensing device 76. The electronic control unit 50 utilizes the generated control signals to automatically implement the control methods and strategies related to the presented solution.

According to the presented solution, based on signals received from the one or more position sensing devices 76, the electronic control unit 50 is able to select a control strategy in accordance with the determined position of the moveable device 78 or the actuator 63. The control unit 50 controls the control system 60 according to the selected control strategy.

According to two examples of the presented solution, the electronic control unit 50 in particular controls the directional control valve device 66 or the apparatus 62 based on the control strategy. According to another example, the control unit 50 controls the pressure control device 74 based on the control strategy.

Figure 3:
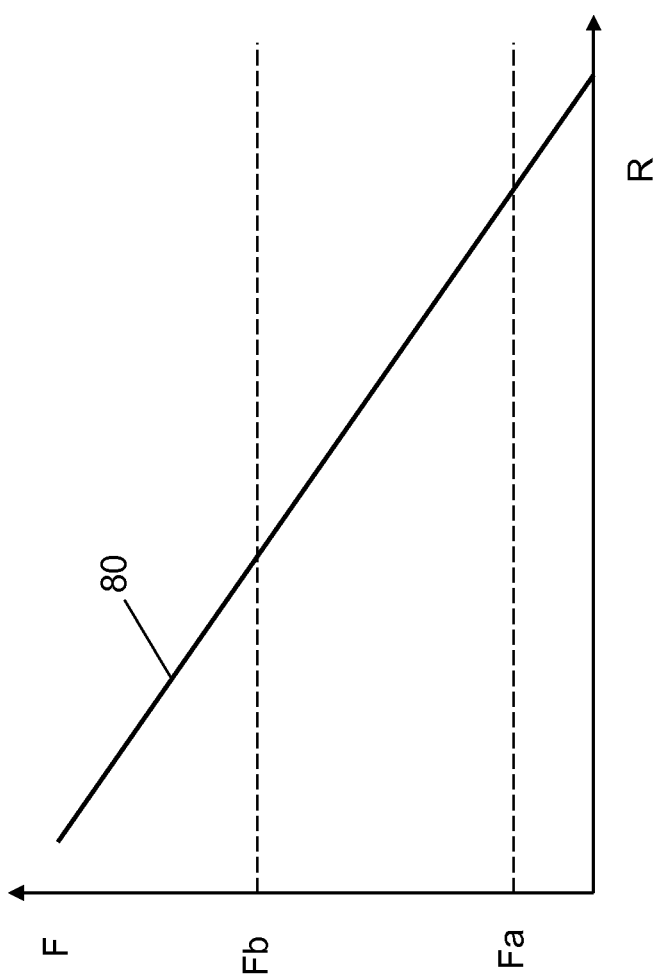
FIG. 3 shows a traditional method of controlling hydraulic control systems.

FIG. 3 shows an example control strategy based on a traditional method. The horizontal R axis relates to the position of the moveable device 78 and the vertical F axis relates to forces experienced by the moveable device 78. As explained above, the reach of the moveable device 78 depends on the position of the moveable device 78. In particular, the horizontal R axis may relate to the reach R, Ra or Rb of the boom 20. A curve 80 shows the relationship between the reach and the predetermined maximum forces allowed when performing a work function. The relationship is traditionally linear. In particular, the vertical F axis relates to forces generated by the linear actuator 64, e.g. a hydraulic cylinder, and acting on the moveable device 78.

A parameter Fb shows a level of force above which the forces are considered to be too high. A particular example for this case is when the boom 20 is retracted and forces acting on the boom 20 load the structure or the joint arrangements of the boom 20. A parameter Fa shows a level of force above which the forces are considered to be too low for successfully performing a work function. A particular example for this case is when the boom 20 is extended and a load is lifted with the tool 30 attached to the boom 20.

Figure 4:
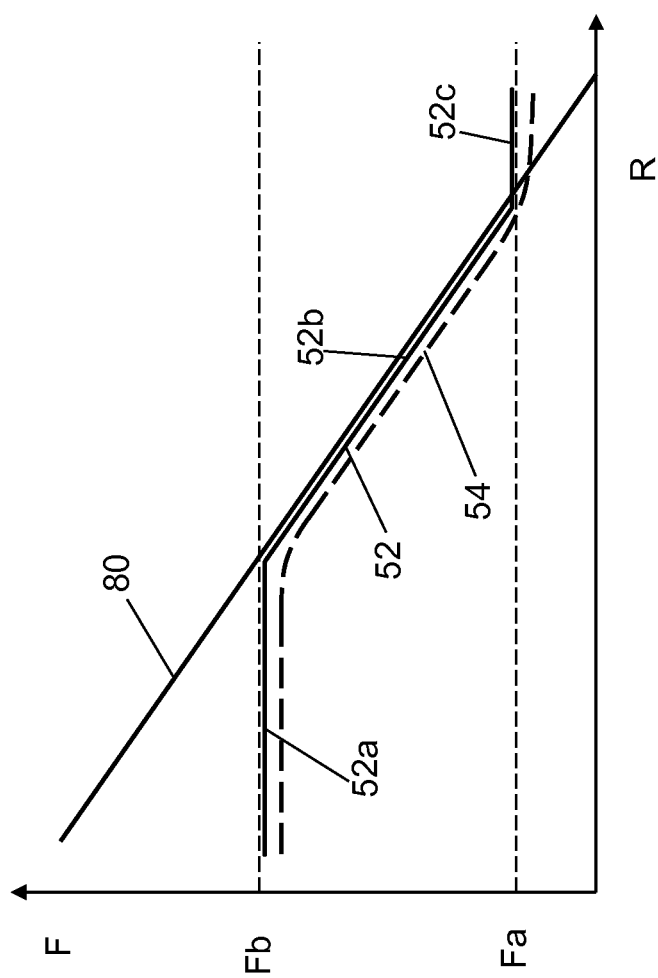
FIGS. 4 and 5 show methods of controlling hydraulic control systems according to the presented solution.

A different approach related to the presented solution is shown in the example control strategy of FIG. 4. Depending on the position of the moveable device 78, in particular the reach R, when a force acting on the moveable device 78 is considered to be too high and above a predetermined level defined by the parameter Fb, the force is limited to or below the parameter Fb. This control strategy is shown by a curve 52a. Alternatively or additionally, depending on the reach R, when a force falling on the moveable device 78 is considered to be too low and below a predetermined level defined by the parameter Fa, the force is allowed to rise to or above the parameter Fb. This control strategy is shown by a curve 52c. The raised force is preferably short-termed to protect the moveable device 78 from long-term overload.

A curve 52b relates to intermediate values of force that are not limited nor affected by the parameter Fa or the parameter Fb, or both. The value of the parameter Fb is higher than the value of the parameter Fa.

Figure 5:
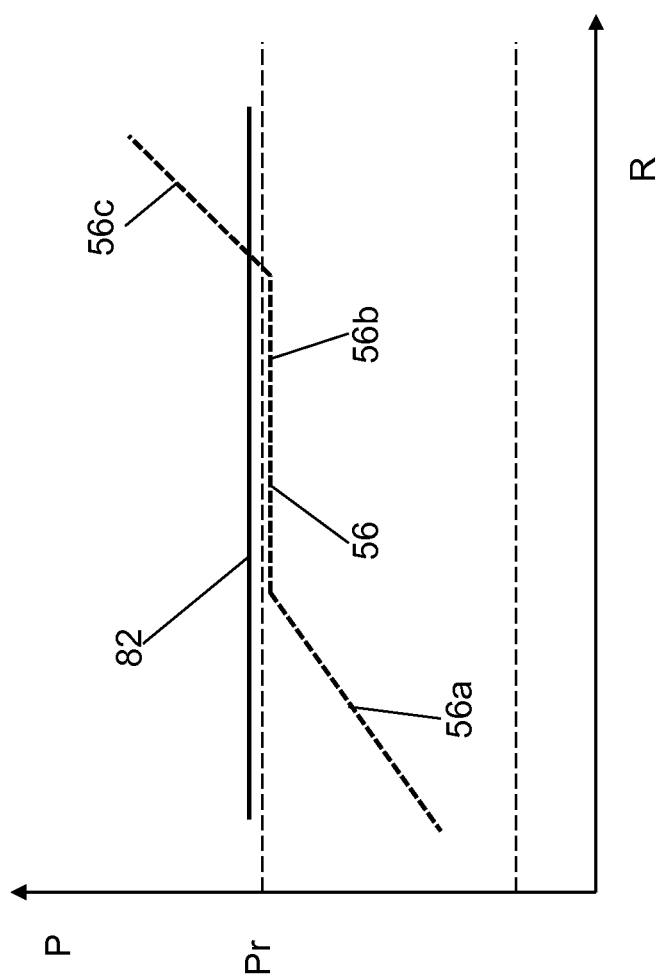

According to an example of the presented solution, the forces, or torque, acting on the moveable device 78 for performing work functions are generated in the actuator 63 as a function of hydraulic fluid pressure. Thus, the forces shown in FIG. 4 depend on the hydraulic fluid pressure. An example control strategy based on the hydraulic fluid pressure in the actuator 63 is shown in FIG. 5. FIG. 5 relates to the same work function as FIG. 4. In FIG. 5, the vertical P axis relates to the hydraulic fluid pressure regulated by the hydraulic control system 60 and acting on the actuator 63. Depending on the position of the moveable device 78, in particular the reach R, when a force or torque acting on the moveable device 78 is considered to be too high, the hydraulic fluid pressure is limited. This control strategy is shown by a curve 56a representing a predetermined maximum pressure relating to the hydraulic fluid pressure. The hydraulic fluid is pressurized at most to the predetermined maximum pressure for performing work. According to an example, the shorter the reach R is the lower the predetermined maximum pressure is.

Alternatively or additionally, depending on the position of the moveable device 78, in particular the reach R, when a force or torque acting on the moveable device 78 is considered to be too low, the hydraulic fluid pressure is allowed to rise. This control strategy is shown by a curve 56c representing a predetermined maximum pressure relating to the hydraulic fluid pressure. The hydraulic fluid is pressurized at most to the predetermined maximum pressure for performing work. According to an example, the longer the reach R is the higher the predetermined maximum pressure is.

A curve 56b relates to values of force or torque that are allowable and represents predetermined maximum pressures the hydraulic fluid is pressurized at most. However, the predetermined maximum pressure need not be dependent on the position of the moveable device 78. For comparison, a control strategy based on the traditional method is represented by a curve 82 showing no dependence on the position of the moveable device 78.

The predetermined maximum pressure may be set lower for positions (see the curve 56a) different from other, basic positions represented by the curve 56b. Alternatively or additionally, the predetermined maximum pressure may be set higher for positions (see the curve 56c) different from other, basic positions represented by the curve 56b.

According to the presented solution, the control system 60 is adapted to allow hydraulic fluid pressures with a value at or below the predetermined maximum pressure. The predetermined maximum pressure represents the pressure the hydraulic fluid delivered to the actuator 63 is at most pressurized.

For comparison, in the traditional method, the predetermined maximum pressure is not dependent on the position of the moveable device 76, which is shown by the curve 82 representing a predetermined maximum pressure and defined by a parameter Pr having a constant or fixed value. The predetermined maximum pressure represented in the curve 82 of FIG. 5 allows a force represented in the leftmost part of the curve 80 of FIG. 4 to raise above the parameter Fb in some predetermined positions of the moveable device 78. Alternatively or additionally, the predetermined maximum pressure and defined by the parameter Pr represented in the curve 82 of FIG. 5 does not allow a force represented in the rightmost part of the curve 80 of FIG. 4 to raise above the parameter Fa in some predetermined positions of the moveable device 78.

The control strategy according to the presented solution may be based on a linear relationship as shown by the curve 52 or the curve 56. Alternatively or additionally, the control strategy may be based on a mathematical relationship, a function, linear or nonlinear relationship, or tabulated values, as shown by a curve 54 in FIG. 4, or on any combination of these.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A control system for controlling a moveable device, comprising:
    at least one hydraulic actuator associated with the moveable device for performing at least one work function, wherein the moveable device is movable into several basic positions and at least one retracted position, wherein when retracted a reach of the moveable device is less than when in the basic positions;
    at least one position sensing device to determine the position of at least one of the moveable device and the hydraulic actuator; and
    a hydraulic control system, including an electronic control unit, for controlling the hydraulic actuator, wherein the hydraulic control system is configured to deliver pressurized hydraulic fluid at a pressure to the hydraulic actuator, the hydraulic fluid being pressurized at most to a predetermined maximum pressure, and wherein the control system is adapted to regulate the predetermined maximum pressure to be lower in the retracted position than in the basic positions.

2. The control system according to claim 1, wherein the hydraulic actuator is one of a hydraulic linear actuator and a hydraulic rotary actuator connected to the moveable device; and
    wherein the hydraulic actuator is adapted to one of rotate the moveable device about an axis and to linearly move the moveable device.

3. The control system according to claim 2, wherein the moveable device is movable into several positions such that the reach of the moveable device is dependent on the positions, wherein the control system is adapted to regulate the predetermined maximum pressure on the basis of the reach.

4. The control system according to claim 1, wherein the moveable device is movable into several positions such that the reach of the moveable device is dependent on the positions, wherein the control system is adapted to regulate the predetermined maximum pressure on the basis of the reach.

5. The control system according to claim 4, wherein the shorter the reach is the lower the regulated predetermined maximum pressure is.

6. The control system according to claim 4, wherein the longer the reach is the higher the regulated predetermined maximum pressure is.

7. The control system according to claim 1, wherein the shorter the reach is the lower the regulated predetermined maximum pressure is.

8. The control system according to claim 1, wherein the moveable device is movable into several basic positions and at least one extended position, wherein when extended the reach of the moveable device is longer than when in the basic positions, wherein the control system is adapted to regulate the predetermined maximum pressure to be higher in the extended position than in the basic positions.

9. The control system according to claim 8, wherein the longer the reach is the higher the regulated predetermined maximum pressure is.

10. The control system according to claim 1, wherein the moveable device is one of an articulated boom and a boom section of the articulated boom.

11. The control system according to claim 1, wherein the control system further comprises at least one directional control valve device with pressure reducing functions controlling the flow of the pressurized hydraulic fluid to the hydraulic actuator, wherein the directional control valve device is regulated by the electronic control unit in accordance with the predetermined maximum pressure.

12. The control system according to claim 1, wherein the control system further comprises at least one variable displacement hydraulic pump device with load-sensing functions adapted to supply the hydraulic actuator with the pressurized hydraulic fluid, wherein the hydraulic pump device is regulated by the electronic control unit in accordance with the predetermined maximum pressure.

13. The control system according to claim 1, wherein the position sensing device includes a sensor adapted to transmit a signal indicative of one of the position of the moveable device and the hydraulic actuator.

14. A working machine vehicle, comprising:
a moveable device, the moveable device being one of an articulated boom and a boom section of the articulated boom connected to the working machine vehicle; and
a control system for controlling the moveable device, the control system having:
at least one hydraulic actuator associated with the moveable device for performing at least one work function, wherein the moveable device is movable into several basic positions and at least one retracted position, wherein when retracted a reach of the moveable device is less than when in the basic positions;
at least one position sensing device to determine at least one of the position of the moveable device and the hydraulic actuator; and
a hydraulic control system, including an electronic control unit, for controlling the hydraulic actuator, wherein the hydraulic control system is configured to deliver pressurized hydraulic fluid at a pressure to the hydraulic actuator, the hydraulic fluid being pressurized at most to a predetermined maximum pressure, and wherein the control system is adapted to regulate the predetermined maximum to be lower in the retracted position than in the basic positions.

15. The working machine vehicle according to claim 14, wherein the working machine vehicle is one of a forestry harvester, a forestry forwarder, an agricultural tractor, a working machine equipped with a backhoe or a front end loader, a construction equipment vehicle and an excavator.

16. A method of controlling a moveable device by using a hydraulic control system having an electronic control unit, the method comprising:
performing a work function with the moveable device controlled by at least one hydraulic actuator associated with the moveable device, wherein the moveable device is movable into several basic positions and at least one retracted position, wherein when retracted a reach of the moveable device is less than when in the basic positions;
sensing the position of at least one of the moveable device and the hydraulic actuator;
delivering hydraulic fluid at a pressure to the hydraulic actuator and pressurizing the hydraulic fluid at most to a predetermined maximum pressure; and
regulating the predetermined maximum pressure to be lower in the retracted position than in the basic positions based on the determined position.

17. The method according to claim 16, wherein the method further comprises:
moving the moveable device to several positions such that the reach of the moveable device is dependent on the positions; and
regulating the predetermined maximum pressure on the basis of the reach.

* * * * *